April 29, 1924. 1,492,162

EMILE-JACQUES DELENS

CLASSIFYING APPARATUS FOR EXAMINING STEREOSCOPIC OR PANORAMIC VIEWS

Filed July 20, 1921  5 Sheets-Sheet 1

Inventor
Emile-Jacques Delens
by Lawrence Langner
Attorney

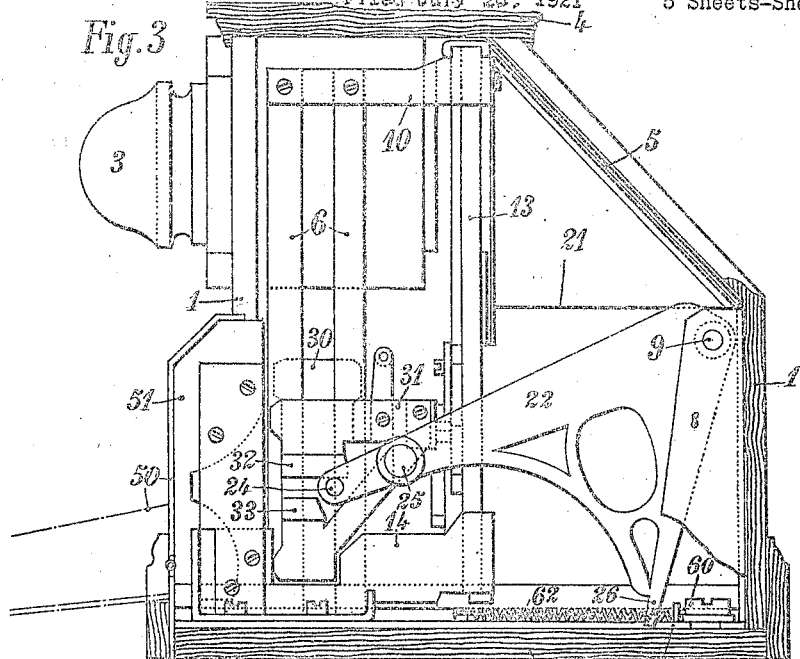

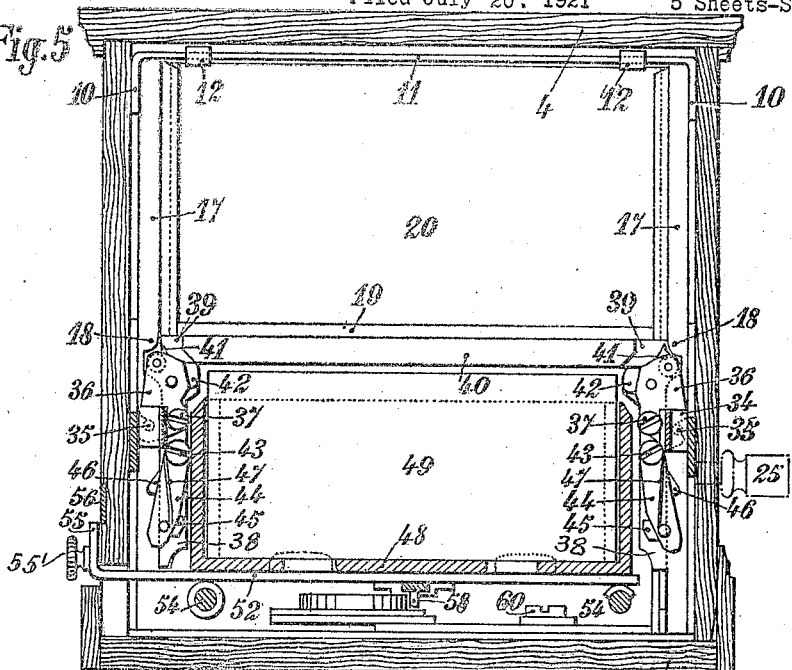
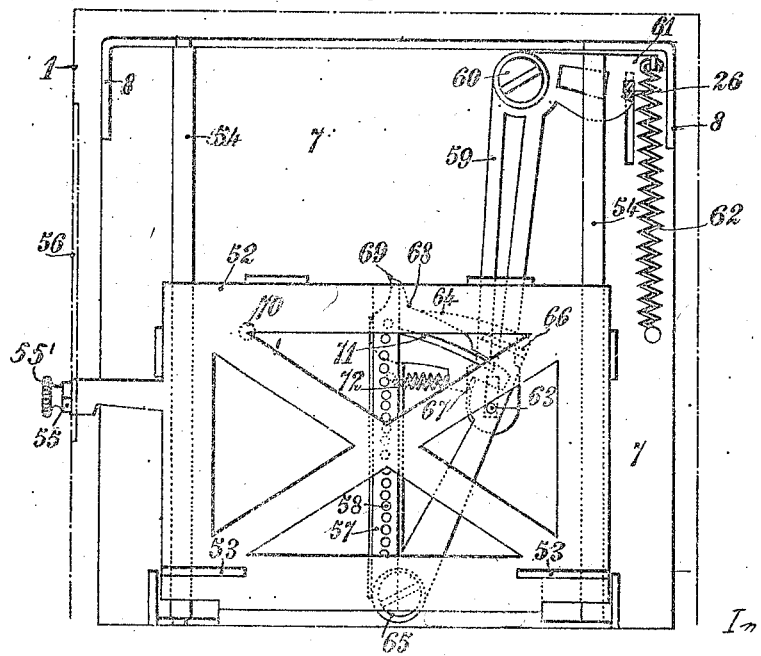

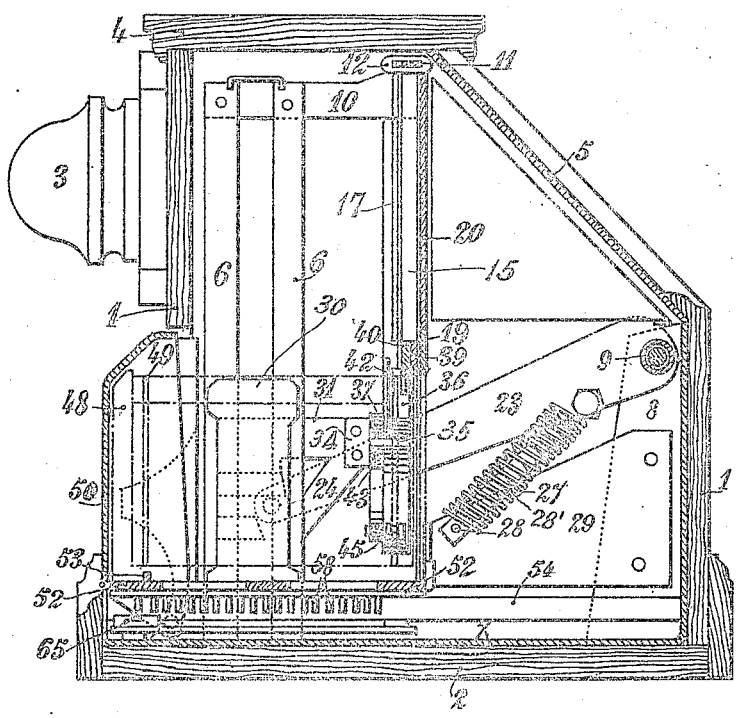

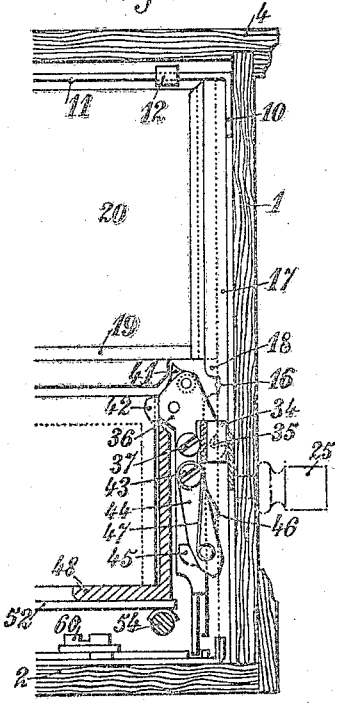
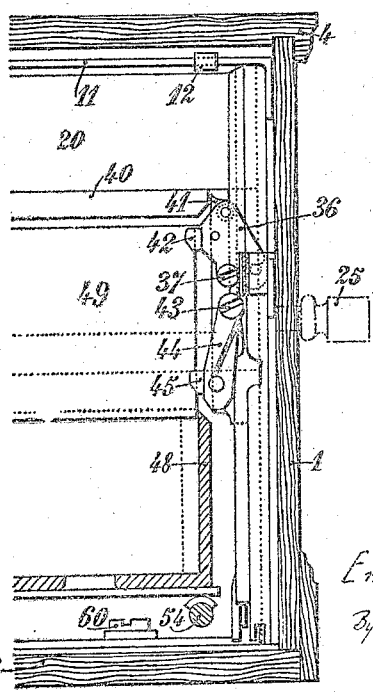

Patented Apr. 29, 1924.

1,492,162

UNITED STATES PATENT OFFICE.

EMILE-JACQUES DELENS, OF VERSAILLES, FRANCE.

CLASSIFYING APPARATUS FOR EXAMINING STEREOSCOPIC OR PANORAMIC VIEWS.

Application filed July 20, 1921. Serial No. 486,194.

*To all whom it may concern:*

Be it known that I, EMILE-JACQUES DELENS, citizen of the French Republic, residing at 33 Rue Jacques Boyceau, Versailles, Seine and Oise, France, have invented certain new and useful Improvements in a Classifying Apparatus for Examining Stereoscopic or Panoramic Views, of which the following is a specification.

In the apparatus actually in use for examining stereoscopic views, the plates contained in the grooved box are raised, for coming opposite the eye-pieces, by a vertical frame arranged below the box and on which rests the lower edge of the plate.

This arrangement necessitates the provision, below the box, for allowing the frame to withdraw, of an empty space corresponding, at the minimum, to the height of raising of the plates and the apparatus is thus very cumbersome. On the other hand, the frame which lifts the plate frequently scratches the gelatin of the preceding plate in front of which it slides at a very small distance.

This invention relates to an apparatus for examining stereoscopic or panoramic views, characterized in that the plates are drawn along by clips which grasp them and hold them by their side edges and raise them vertically for bringing them to the level of the eye-pieces and these clips are withdrawn, when the apparatus is in its position of rest, against the side walls of the grooved box, which contains the plates.

The accompanying drawings, illustrate, by way of example, a form of construction of the apparatus.

Fig. 3 is a side view of the same, on the side of the controlling lever.

Fig. 4 is a plan view of the members controlling the forward movement of the carriage.

Fig. 5 is a longitudinal vertical section of the apparatus showing, in its position of rest, the device for raising the plates.

Fig. 6 is a vertical cross section thereof.

Figs. 7 and 8 are partial vertical longitudinal sections showing the operation of the device for raising the plates.

Fig. 9 is a plan view of the members controlling the forward movement of the carriage in their operative position.

Figure 1:
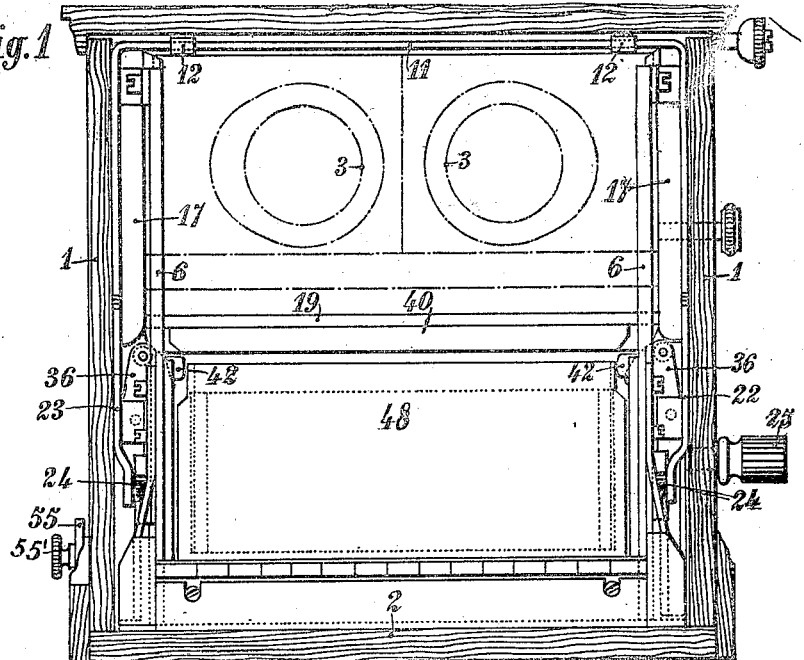
Fig. 1 is a front view of the whole of the apparatus, the parts being in their position of rest and the outer box being cut away.
Figure 2:
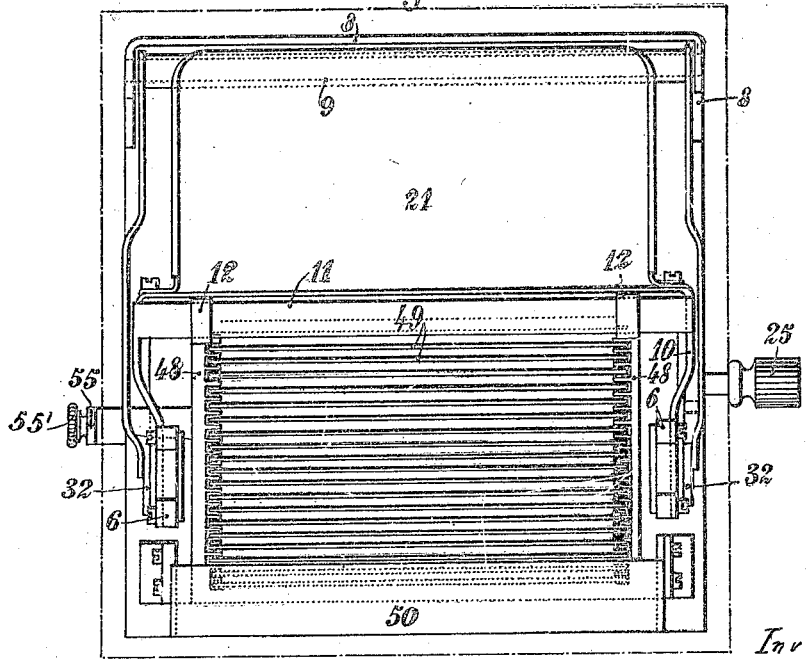
Fig. 2 is a plan view thereof.

As seen in the drawings, the device is contained in a box 1, having a base 2, said box having eye pieces carried by its front face, and having adjusting and focusing means for the eye pieces. The box is closed at the top by a cover 4, and at the rear by a ground glass 5, inclined 45° to the vertical, the function of which is explained below.

The device has two vertical guide bars 6, fixed on each side of a plate 7, which is positioned on the base 2 of the box. The plate 7 is bent on itself to form a rear vertical wall, with lateral prolongations 8, tied together by an axle 9. The guides 6 are held together at their upper ends by a plate 10, cut and bent to be fixed on the guides, and to form a longitudinal cross member 11 carrying two resilient abutments 12. To the plate 10, is fixed the upper ends of two vertical supports 13, held at their lower ends by plates 14, fastened to the plate 7, and to the guides 6. The supports 13, are formed to present, at their upper ends, and at a proper height, slides 15, (Fig. 6) terminated by notches 16 (Fig. 7) and prolonged by other slides formed by plates 17, fixed to the supports 13, and presenting at their lower extremities cams 18. A cross bar 19, fixed to the rear face of the supports 13, supports a vertical ground glass 20, in the line of vision of eye-pieces 3.

Between the ground glasses 20, and 5, is a horizontal reflector 21, of sheet iron. This reflector suppresses the grain of the glass 20, and permits uniform lighting of the device whatever the direction of the incoming light. The glass 5, and reflector 21, break up and diffuse the light, so as to give a very uniform lighting of the ground glass 20, regardless of the direction of the incoming rays of light.

The axle 9 is enclosed by a tube on which are fixed two levers 22 and 23, movable against the external lateral walls of the supports 13, and having projections 24 at their free ends. Lever 22 is furnished with an operating knob 25 extending out of the box, and the lever 22 is furnished with an arm carrying at its lower end a finger 26. The lever 23 is furnished with a return spring 27, mounted on a guide rod 28', pivoted on an axis 28 which is carried by a cross piece 29, fixed to one of the side pieces 8.

In the guides 6, are slides 30, each one carrying on its outer lateral face, portions 31, on which are fixed two parallel rectangular carriers 32 and 33, one above the other, the upper one 32 being longer than the lower one 33, in order to be constantly in contact with the projections 24, when levers 22 and 23 are raised, as indicated below.

Members 34, fixed to the ends of bars 31, carry pins 35 which enter notches in the pawls 36, pivoted by screws 37, to vertical rods 38 of a frame sliding in slide 15, of members 13. The frame comprises a horizontal cross piece 39, on the front face of which is a reglet 40, shorter than the cross piece whereby to leave at either side of the latter a limited opening for each of the oblique ends of the reglet.

The pawls 36 each have a nose 41 and a foot 42, of rubber. Below pawls 36, and also on the vertical rods 38, other pawls 44 are pivoted by means of screws 43, and having feet 45 and projections 46. The pawls 44, are controlled by leaf springs 47, attached at the pivot point and pressing the feet of the pawls 44, outside of the vertical plane of rods 38.

The box 48, containing the photographic plates, is placed in the device through a pivoted door 50, to which it is fastened by projections 53 on the carriage, and engaging in corresponding sockets in the bottom of the box.

The carriage 52 is mounted to slide on cylindrical rods 54, and carries a knob 55 and an index 55, cooperating with a graduated scale 56 fixed to the side of the box 1, opposite the control handle 25.

A rule 57, fixed on the bottom and on the longitudinal central line of the carriage 52 has pins 58, of a number equal to that of the views contained in the box 48.

The carriage-feeding mechanism is constituted by a bent lever 59 pivoted on an axis 60 carried by the frame 7 and one of the branches of which is provided with a nose 61 subjected to the action of a returning spring 62 and on which acts the finger 26 of the lever 22. The other branch of the lever 59 is provided at its end with a groove in which is engaged the pin 63 of a segment 64 hinged on an axis 65 and carrying a concentric tenon 66 and an abutment 67.

A pawl 68 having a finger 69 fitting against an abutment 70 is pivoted on the segment 64; and this pawl carries an incline 71 which is off center relative to the axis of the segment and it is urged by a spring 72 which holds it against the abutment 67 of the segment.

The apparatus thus constituted operates in the following manner:

When the parts are in their position of rest, as illustrated in Figs. 5 and 6, the box 48 containing the photographic plates rests on the carriage 52 and the upper end of the first plate, extending above the box, comes opposite the clips 42 of the upper pawls 36. By moving the operating handle 25 upwardly, the two levers 22 and 23 pivot in their axis 9 and lift through their tenons 24 the bearings 32 which drive the brackets 30 and cause them to move in the slides 6. The pins 35, engaged in the notches of the upper pawls 36, cause these pawls to pivot on their axes 37, until their pads 42 have grasped the plate by its side edges.

By further upward movement of the operating handle 25 and levers 22 and 23, the plate 49 rises with the frame 40; the heel-pieces 41 of the pawls 36 come in contact with the inclines 18, this having for effect to accentuate the clamping of the plate and to firmly hold the same. At the moment the lower pawls 44 come to the level of the inclines 18, their heel-pieces 46, by coming in contact with these inclines, cause them to pivot on their axes 43 and their rubber pads 45 come in contact with the side edges of the plate which they hold at its lower part, as illustrated in Fig. 8. This movement of the lower pawls takes place before the plate 49 is completely disengaged from the grooves of the box 48, in order that the plate may be held between the four clips before leaving the box. It then suffices to continue to raise the plate until the frame 40 encounters the cross-bar 11 and the plate is opposite the eye-pieces 3.

By actuating the levers downwardly, the plate moves downward again; and is then abandoned released by the pads 45 of the lower pawls 44, their heel-pieces 46 being released from the slides 17, and these pawls are brought back to their initial position by their springs 47. The plate, already engaged at its base in the grooves of the box 48, continues to move downward and takes back its place in this box. The pressure is maintained on the operating handle until the frame 40 comes to its position of rest, this causing the upper pawls 36 to pivot on their axes and disengaging the plate from their pads 42.

For determining the advance of the carriage 52 and of the box 48, in order to examine the following plate, a pressure is exerted on the operating handle 25 for displacing the levers 22 and 23 downwardly.

The tenons 24, passing freely in front of the lower bearings 33, these levers abandon the plate-rising mechanism for actuating the carriage-feeding mechanism. The finger 26, by pushing the nose 61, causes the lever 59 to pivot on its axis 60 and this lever drives, through the pin 63, the segment 64 which pivots on its axis 65. The angular displacement of the segment causes the incline 71 of the pawl 68 to engage between two teeth 58 of the rack 57. The two extreme points of the incline being out of center, according to a distance equal to that separating two plates and to the spacing apart of two teeth, when the segment has arrived at the end of its movement, the incline 71 has pushed back the carriage and the box 48 to the suitable extent, as illustrated in Fig. 9.

When pressure is released from the operating knob, the lever 59, urged by its spring, comes back to its initial position, at the same time bringing back the segment 64 to its position of rest. During the return movement of the segment, the incline 7 engages again between the two teeth 58 it had abandoned and the pawl 68 freely pivots on its axis without actuating the rack. When the segment has come back to its position of rest, the incline is disengaged from the teeth and the pawl is brought back against the abutment 67 by its spring 72, the end of the incline 71 thus coming opposite the two following teeth. The carriage is held in position by the concentric tenon 66 which engages between the two preceding teeth.

For bringing back the carriage to its position of rest when all the plates have been examined, the operating handle 25 is pressed upon so as to disengage the incline 71 and the tenon 66 from the teeth and the carriage can freely slide forward or backward on its rails.

What I claim as my invention and desire to secure by Letters Patent is:

1. In a classifying apparatus for examining stereoscopic or panoramic views, clips arranged on either vertical side of the plates contained in the magazine-drawer, a frame connecting the said clips, side slide-blocks vertically moving in corresponding slides, notches in the said slide-blocks, acting on tenons provided on the clips for determining the rocking of the same and allowing them to grasp the plates, and means for vertically displacing the said slide-blocks relatively to their slides.

2. In a classifying apparatus for examining stereoscopic or panoramic views, clips arranged on either vertical side of the plates contained in the magazine-drawer, a frame carrying the said clips, side slide-blocks vertically moving in corresponding vertical slides, notches in these slide-blocks acting on tenons provided on the clips for determining the rocking of the same and allowing them to grasp a plate, side carriages moving on the said slides for actuating the corresponding slide-blocks, abutments on the said carriages, for engaging with pins carried by pivoting operating levers, an axis rendering the said pivoting levers integral with each other, which levers are subjected to the lowering action of a spring, and a handle for moving upwardly the whole of the said pivoting levers.

3. In a classifying apparatus for examining stereoscopic or panoramic views, clips arranged on either vertical side of the plates contained in the magazine-drawer, a frame carrying the said clips, side slide-blocks vertically moving in corresponding vertical slides, notches in these slide-blocks acting on tenons provided on the clips for determining the rocking of the same and allowing them to grasp a plate, side carriages moving on the said slides for actuating the corresponding slide-blocks, upper abutments on the said carriages, for engaging with pins carried by pivoting operating levers, an axis rendering the said pivoting levers integral with each other, a spring acting on the levers, a handle for controlling the latter, and means for vertically raising the clips as well as the plate to be examined.

4. In a classifying apparatus for examining stereoscopic or panoramic views, clips for grasping the plates, a frame carrying the clips, means for determining the rocking of the clips and permitting to grasp the plates, side inclines acting on the clips for determining a supplementary clamping or tightening action of the plate, during their vertical displacement, and means for grasping the plate laterally and by the lower part of its side edges when it is lifted outside the magazine-drawer.

5. In a classifying apparatus for examining stereoscopic or panoramic views, upper clips arranged for grasping the plates, a frame carrying the clips, means for determining the rocking of the clips and permitting to grasp the plates, side inclines acting on the clips for determining a supplementary tightening action of the plate during their vertical displacement, other clips arranged below the former on the same movable frame, heel-pieces on the said clips for determining by their engagement with the side inclines their oscillation and the immobilization of the plate by the lower part of its lateral sides, as well as the drawing of the plate outside the magazine-box, and means for displacing the latter when, by a reverse operation, the plate is replaced in the classifying-box.

6. In a classifying apparatus for examining stereoscopic or panoramic views, upper clips arranged for grasping the plates, a frame carrying the clips, means for determining the rocking of the clips and permitting to grasp the plates, side inclines acting on the clips for determining a supplementary tightening action of the plate during their vertical displacement, lower clips arranged below the former and hinged on the same movable frame, heel-pieces on the said pivoting clips for determining by their engagement with the side inclines, their oscillation and the immobilization of the plate as well as its removal from the magazine-box, an arm depending from the rocking operating levers and acting on a bent lever pivoted on the front part of the apparatus, a spring acting on the said bent lever, and a rocking segment controlled by the said lever for actuating the rack moving the magazine-box.

7. In a classifying apparatus for examining stereoscopic and panoramic views, upper and lower clips adapted to grasp successively the plates by their side edges and to raise them in front of the eye-pieces, a system of levers for actuating the said clips, an arm depending from the said levers, a bent lever horizontally arranged and actuated by the said arm, an antagonistic spring acting on the bent lever, a claw on the end of the said lever, engaging in a mortise provided in a rocking segment, a rib, concentric to the axis of oscillation, on the said segment for immobilizing, in position of rest, the rack displacing the magazine-box, a rocking pawl on the said lever, a rib forming an incline on the said pawl for engaging with the rack and producing its advance when the concentric rib moves away from the said rack, a returning spring acting on the said pawl for permitting its displacement when the segment returns to its position of rest, and means for supporting the said magazine-box.

8. In a classifying apparatus for examining stereoscopic and panoramic views, upper and lower clips adapted to grasp successively the plates by their side edges and to raise them in front of the eye-pieces, a system of levers for actuating the said clips, an arm depending from the said levers, a bent lever horizontally arranged and actuated by the said arm, an antagonistic spring acting on the bent lever, a claw on the end of the said lever, engaging in a mortise provided in a rocking segment, a rib, concentric to the axis of oscillation, on the said segment, for immobilizing, in position of rest, the rack displacing the magazine-box, a rocking pawl on the said lever, a rib forming an eccentric rib on the said pawl, for engaging with the rack and producing its advance when the concentric rib disengages from the rack, a returning spring acting on the said pawl, a carriage supporting the rack and receiving the magazine-box, stops for immobilizing the magazine-box, on the carriage, parallel guides on the said carriage, and a side handle for allowing to move the latter.

9. In a classifying apparatus for examining stereoscopic and panoramic views, upper and lower clips adapted to grasp successively the plates by their side edges and to raise them in front of the eye-pieces, a system of levers receiving an angular displacement, actuating the said clips in their upward movement and displacing the magazine-drawer, upon their downward movement, a carriage with a rack, receiving the magazine-box, stops on the said carriage engaging with the magazine-box for holding the latter in position, parallel guides on the said carriage, a sliding sleeve on one of the guides and depending from the carriage, a semi-cylindrical shoe arranged opposite the said sleeve and sliding on the combined guide, a side handle depending from the said carriage and moving over a graduated scale carried by the casing of the apparatus.

In testimony whereof I have affixed my signature.

EMILE-JACQUES DELENS.